United States Patent
Cai et al.

(10) Patent No.: US 7,640,030 B2
(45) Date of Patent: Dec. 29, 2009

(54) SMPP MESSAGE PROCESSING FOR SMS SPAM FILTERING

(75) Inventors: Yigang Cai, Naperville, IL (US); Donna L. McGreal, Chicago, IL (US); Sanjeev Kumar Singh, New Albany, OH (US); Randy Honggang Yang, Qingdao (CN); Li Chun Zhang, Linqing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 561 days.

(21) Appl. No.: 11/427,359

(22) Filed: Jun. 29, 2006

(65) Prior Publication Data

US 2008/0004049 A1    Jan. 3, 2008

(51) Int. Cl.
*H04W 4/00* (2006.01)
(52) U.S. Cl. .................. 455/466; 455/410; 455/411; 455/423; 455/404.1
(58) Field of Classification Search ............... 455/466, 455/410, 411, 423, 404.1
See application file for complete search history.

(56) References Cited

U.S. PATENT DOCUMENTS

| | | |
|---|---|---|
| 6,424,948 B1 | 7/2002 | Dong et al. |
| 6,499,023 B1 | 12/2002 | Dong et al. |
| 2003/0053615 A1 | 3/2003 | Anderson et al. |
| 2005/0020289 A1* | 1/2005 | Kim et al. ............ 455/466 |
| 2005/0251861 A1* | 11/2005 | Cunningham et al. ...... 726/23 |
| 2006/0041622 A1 | 2/2006 | Qutub et al. |
| 2006/0105750 A1 | 5/2006 | Zabawskyj et al. |
| 2008/0077995 A1* | 3/2008 | Curnyn ................ 726/27 |

* cited by examiner

*Primary Examiner*—Joseph H Feild
*Assistant Examiner*—Huy D Nguyen
(74) *Attorney, Agent, or Firm*—Fay Sharpe, LLP

(57) ABSTRACT

Spam filtering methods and systems are provided for filtering spam SMS SMPP messages from an ESME to an SMSC associated with a wireless network, in which an anti-spam application receives SMPP SMS messages from the ESME and performs spam filtering prior to providing SMPP messages to the wireless network, with good messages being forwarded to the SMSC of the network and spam messages being discarded or persisted.

18 Claims, 7 Drawing Sheets

SMS Messages without delivery notification

MESSAGE delivery by MSC

SMPP MESSAGE PROCESSING FOR SMS SPAM FILTERING

BACKGROUND OF THE INVENTION

The present invention involves filtering short message peer-to-peer protocol (SMPP) short message service (SMS) messages for spam in wireless networks and will be described with specific reference thereto, although it will be appreciated that the invention may have usefulness in other fields and applications, such as other types of SPAM filtering of SMPP SMS messages. With the advancements in communication technologies such as the Internet and wireless communications networks, the ability of people to communicate with one another has become seamless and largely ubiquitous. However, these same technological advances have made it easy for advertisers, hackers, etc. to send large amounts of unsolicited messages or spam to communications devices. Most Internet users are unfortunately all-too familiar with spam email and other similar nuisances. In addition to creating difficulties for the end users of such advanced communications systems, spam also occupies service provider resources, wherein spam email and the like has affected the revenue generation capabilities of Internet service providers generally. Further, spam can be used to attempt to defraud unsuspecting users by enticing users to provide credit card or other personal information. Beyond email type of spam, moreover, owners and commercial operators of wireless telecommunications networks must deal with SMS spam, wherein the provision of such short messaging services has heretofore provided another avenue for unscrupulous spammers to propagate spam. In the wireless telecommunications context, like that of the Internet, spam creates an uncomfortable user experience along with increased operational expenses for service providers due at least partially to increased SS7 and IP network message traffic. Prior spam filtering attempts have focused on sorting out spam at the Short Message Service Centers (SMSCs or SMS-Cs) of the network, but this type of approach may be only partially successful in minimizing overall network traffic. Thus, there is a need for improved systems and methodologies for combating spam by which the associated network traffic and user dissatisfaction can be mitigated.

SUMMARY OF THE INVENTION

The following is a summary of one or more aspects of the invention provided in order to facilitate a basic understanding thereof, wherein this summary is not an extensive overview of the invention, and is intended neither to identify certain elements of the invention, nor to delineate the scope of the invention. The primary purpose of the summary is, rather, to present some concepts of the invention in a simplified form prior to the more detailed description that is presented hereinafter. The various aspects of the present invention relate to methods and systems for filtering of spam SMPP SMS messages before they get to a mobile telecommunications network so as to mitigate spam-related network traffic and to alleviate negative wireless customer experiences.

In accordance with one or more aspects of the present invention, methods are provided for filtering spam SMS SMPP messages between an External Short Messaging Entity (ESME) and a short message service center (SMSC) associated with a wireless network. The methods include receiving SMPP SMS messages from the ESME and providing the SMPP SMS messages to an anti-spam application (ASA) running on a network server or other network component or element. The ASA classifies the SMPP SMS messages as spam or good prior to providing the SMPP SMS messages to the network, wherein good (e.g., non-spam) SMPP SMS messages are provided to the SMSC of the wireless network and identified spam is either discarded or persisted without attempted delivery to the SMSC. The ASA in one embodiment may perform two-stage spam filtering, including performing first stage spam filtering to classify the SMPP SMS messages as spam, suspected spam or good using a rules engine executing a rule set, and performing second stage spam filtering, such as Bayesian analysis on suspected spam messages to classify the messages as spam or good.

Another aspect of the invention provides a system for filtering spam SMS SMPP messages from an ESME 32 to an SMSC, including a network element, such as a server associated with a wireless network that receives SMS SMPP messages from the ESME to the SMSC, and an anti-spam application running on the network element to receive the SMPP messages from the ESME and to classify the SMPP SMS messages as spam or good prior to providing the SMPP SMS messages to the wireless network. The anti-spam application operates to selectively provide good SMPP SMS messages to the SMSC of the wireless network and to refrain from providing spam SMPP SMS messages to the wireless network.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings. The present invention exists in the construction, arrangement, and combination of the various system components and steps of the method, whereby the objects contemplated are attained as hereinafter more fully set forth, specifically pointed out in the claims, and illustrated in the accompanying drawings in which:

DETAILED DESCRIPTION

Figure 1:
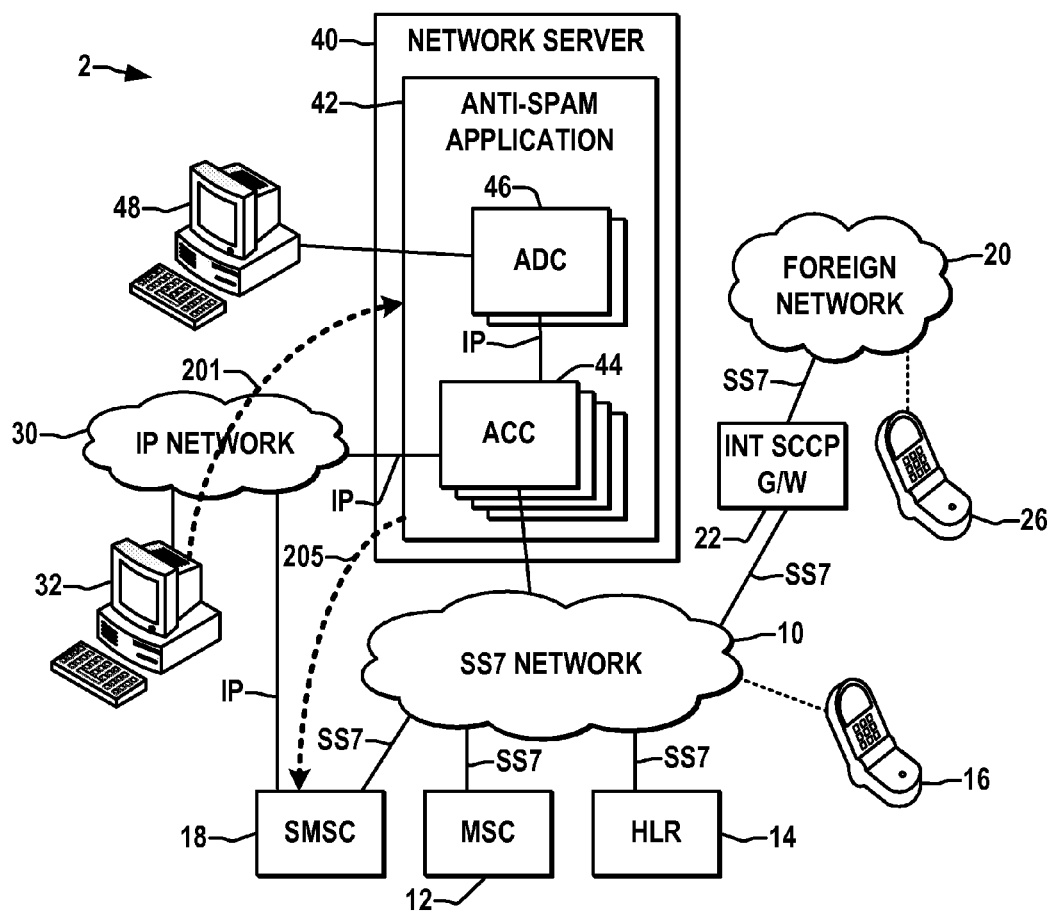
FIG. 1 is a high level schematic diagram illustrating an exemplary telecommunications system with a system for spam filtering of SMPP SMS spam messages with a network server-based anti-spam application in accordance with one or more aspects of the present invention.

Referring now to the figures, wherein the showings are for purposes of illustrating the exemplary embodiments only and not for purposes of limiting the claimed subject matter, FIG. 1 provides a view of a communications system 2 into which the presently described embodiments may be incorporated or in which various aspects of the invention may be implemented. Several embodiments or implementations of the various aspects of the present invention are hereinafter illustrated and described in conjunction with the drawings, wherein like reference numerals are used to refer to like elements throughout and wherein the figures are not necessarily drawn to scale.

Figure 2:
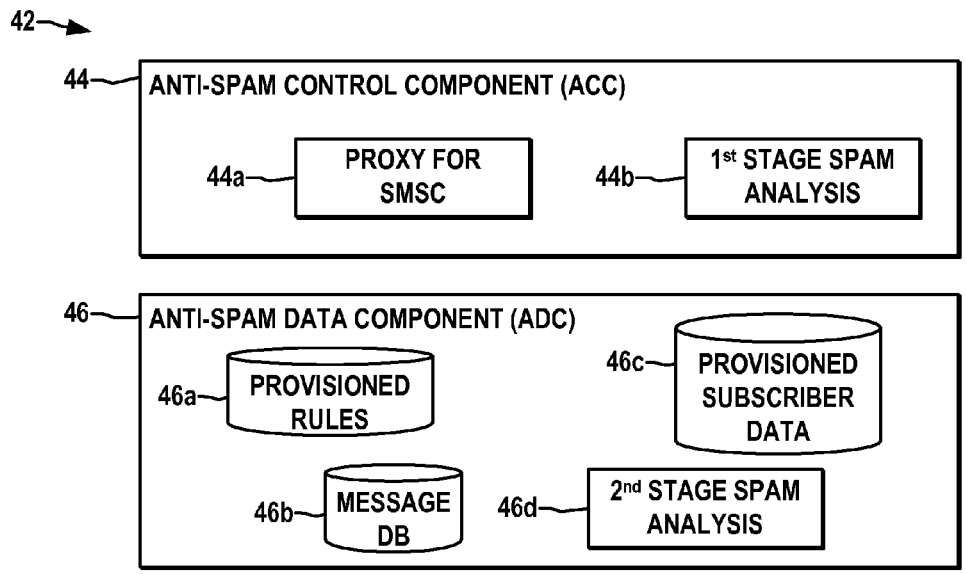
FIG. 2 is a schematic diagram illustrating further details of the exemplary anti-spam application in the system of FIG. 1.
Figure 3:
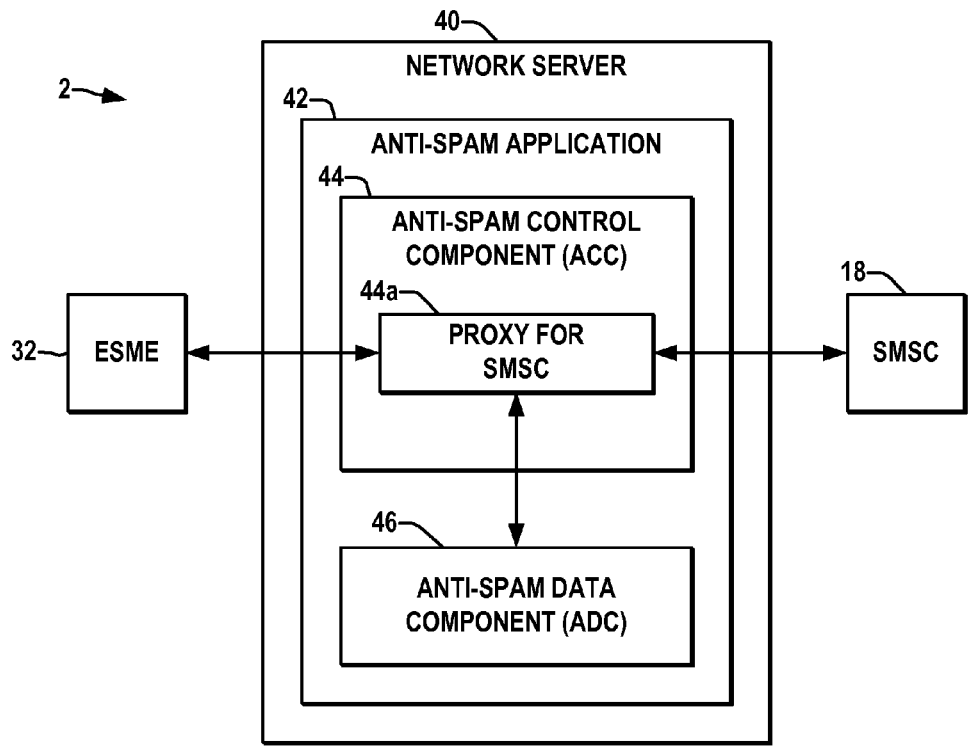
FIG. 3 is a schematic diagram illustrating the anti-spam application serving as a proxy for SMPP SMS messages between an ESME and an SMSC of the wireless network.

Referring initially to FIGS. 1-3, the exemplary telecommunications system 2 of FIG. 1 includes various operationally interconnected networks of various topologies, including a wireless SS7 network 10 in which various MAP are exchanged and operated on with various network elements operatively interconnected to provide mobile telecommunications in a known manner. The exemplary wireless network 10 is a signaling system 7 (SS7) network in Mobile Application Part (MAP) short message service (SMS) and other MAP messages are exchanged, transferred, or otherwise processed or employed. With respect to the present invention, the network 10 allows exchange of SMS messages to and from wireless phones 16 and other devices, wherein the various systems and methods of the invention are applicable to minimize the number of spam SMS messages being received by users and also to reduce the amount of network traffic devoted to spam SMS messages by filtering incoming SMPP spam SMS messages prior to transfer of these to the network 10.

In the simplified illustration of FIG. 1, a single mobile switching center (MSC) 12 and an associated home location register (HLR) 14 are operatively coupled with the network 10 along with a short message service center (SMSC) 18, although it will be appreciated that the system 2 may include any number of MSCs 12, HLRs 14, SMSCs 18, and visitor location registers VLRs, as well as base station systems, base station controllers, etc., and other network elements (not shown) for implementing mobile telecommunications functionality. The wireless network 10 is also operatively coupled to one or more foreign networks 20 via an INT SCCP gateway 22 providing message exchange between the network 10 and the foreign network 20 whereby mobile communications can be achieved between a mobile phone or device 16 located in the network 10 and another mobile communications device 26 in the foreign network 20. In this example, the messaging used in the SS7 network 10 is in accordance with the Mobile Application Part (MAP) protocol, and the exemplary foreign network 20 is similarly an SS7 network using MAP protocol messaging, although not a strict requirement of the present invention and the SS7 networks employing the various aspects of the present invention may be coupled with any type of foreign network using any suitable messaging protocol(s).

The network 10 in the embodiment of FIG. 1 is further operatively coupled with an Internet Protocol (IP) network or other packet-based network 30 for providing communications with one or more IP-based devices, such as a computer 32, wherein the IP-based system 30 may include suitable IP gateway elements (not shown) coupling the packet-switched IP network 30 with the wireless network 10 to provide call and other services including SMPP short messaging (SMS) services between IP-based devices 32 and the exemplary mobile device 16 and other devices associated with the network 10. In particular, the IP network 30 operates to transfer SMPP SMS messages from External Short Messaging Entity (ESME) sources such as the computer 32 or other ESME operatively coupled with the IP network 30 to communications devices associated with the wireless network 10 via the SMSC 18, and also allows devices such as the wireless phone 16 to send SMPP SMS messages to the ESME 32 via the SMSC 18 and the IP network 30. The various exemplary networks 10, 20, and 30 thus provide communicative connection of various communications devices and network elements allowing various telephones, mobile units, computers, digital assistants, etc. to communicate with one another for exchange or transfer of voice and/or video, short messages, and other data or information therebetween, wherein the telecommunications system 2 generally can include any number of wireless, wireline, and/or packet-switched networks, wherein only a few exemplary elements are illustrated in FIG. 1 for purposes of description without obscuring the various SMS spam filtering features and aspects of the invention.

The illustrated system 2, moreover, includes one or more network servers 40 or other network elements, in or on which one or more anti-spam applications (ASA) 42 are run or executed, wherein the anti-spam application 42 can be resident on one network element 40 or can be distributed across multiple network elements operatively coupled with the networks 10 and 30. Moreover, the application 42 can be any suitable combination of hardware, software, logic, etc., whether unitary or distributed, whereby the various spam filtering aspects of the invention can be easily scaled according to network traffic conditions on a dynamic basis. The exemplary ASA 42 in the illustrated embodiment can be accessed for programming via a computer or other device 48 operatively coupled with the server element 40 or with the network 10 for adaptation, programming, updating, etc. by a user and/or a service provider for configuring one or more parameters associated with the spam filtering features described herein.

As shown in FIGS. 1-3, the network server element 40 and the ASA 42 constitute a system for filtering spam SMPP SMS messages to protect the wireless network 10 against excess spam-related traffic and to mitigate undesirable customer experience for subscribers using the wireless network 10. The network server element 40 is operatively coupled with the SS7 network 10 to receive MAP short message service (SMS) messages as well as other MAP messages from the network 10 for SMS spam filtering via the ASA 42 prior to delivery of the SMS messages to a short message service center (SMSC 18), MSC 12, or other switching element of the SS7 network 10. In this manner, the ASA 42 effectively clears SS7 SMS messages emanating from the network 10 or elements coupled therewith whereby SMS SMPP messages sent from the SMSC 18 to the IP network 30 are essentially spam-free.

In one exemplary embodiment, the application 42 includes two primary anti-spam components 44 and 46, in this case identified as an anti-spam control component (ACC) 44 and an anti-spam data component (ADC) 46, either or both of which may be distributed or replicated or instantiated multiple times. As best shown in FIG. 3, moreover, the ASA 42 acts as a proxy for SMS SMPP message transfer between the ESEM 32 and the SMSC 18 of the wireless network 10, to essentially filter all SMPP SMS messages from the ESME 32 to the SMSC 18 prior to delivery of such SMPP messages to the SMSC 18 whereby the wireless network 30 does not encounter spam SMS originating at the ESME 32 or any other source providing SMPP SMS messages to the SMSC 18 via the IP network 30. Moreover, since the ASA 42 filters SS7 MAP SMS spam messages prior to their delivery to the SMSC 18, any resulting SMPP SMS messages from the SMSC 18 to the ESME 32 are already filtered, whereby the ASA 42 simply forwards these to the ESME 32 without further filtering. In a preferred implementation, the ASA 42 thus processes incoming MAP and SMPP messages to filter SMS spam by application of logic in the form of a configurable rules engine and Bayesian analysis, wherein the ASA 42 classifies filtered SMS messages of either type as good or spam so as to mitigate excessive traffic in the wireless network 10 and to minimize user dissatisfaction with received spam short messages.

Figure 4A:
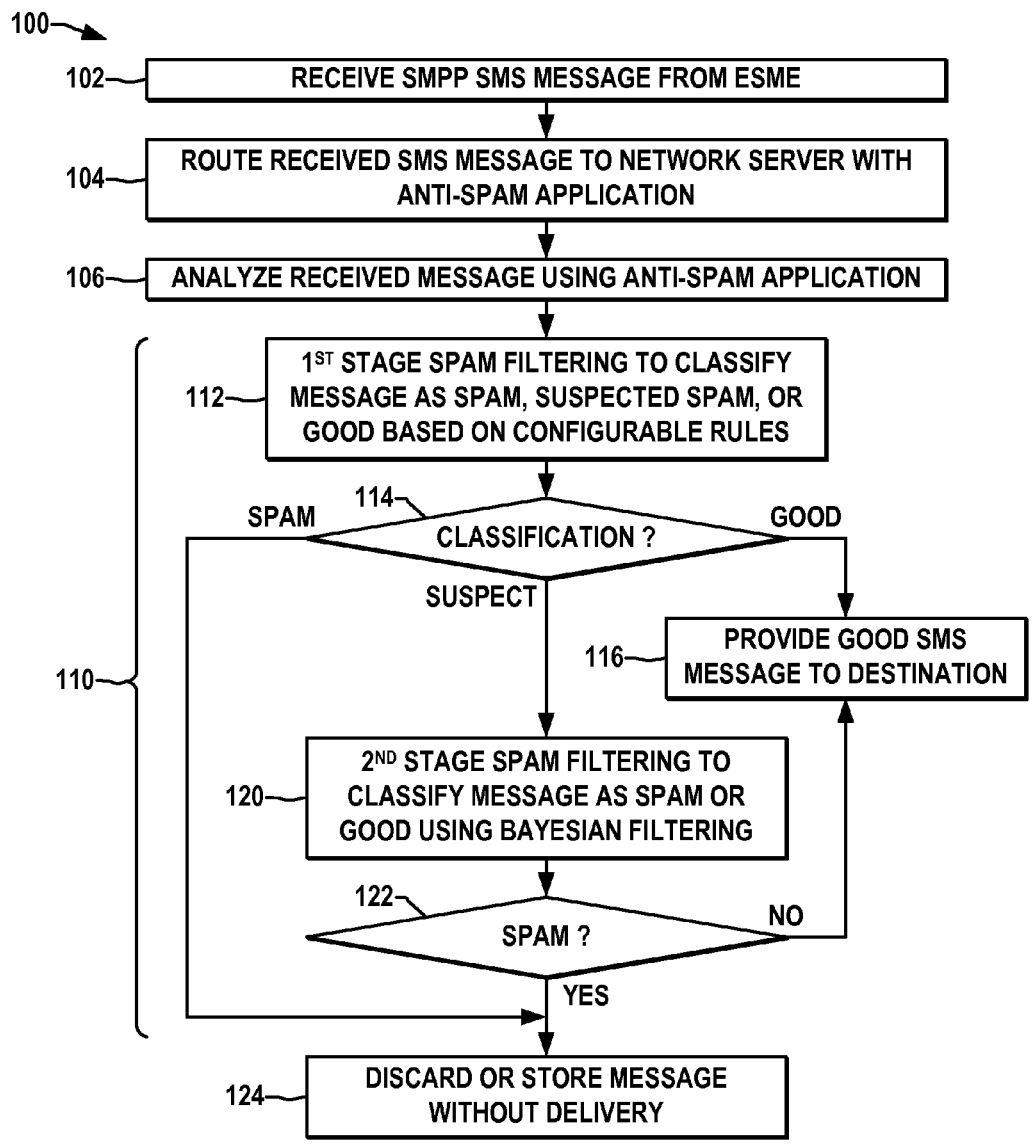
FIGS. 4A and 4B illustrate flow diagrams showing an exemplary methods for filtering spam SMS SMPP messages according to further aspects of the invention.
Figure 4B:
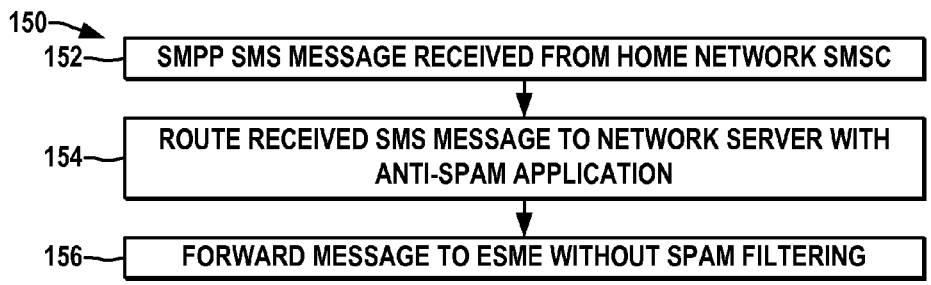

Referring also to FIG. 4B, in the illustrated embodiment, the server 40 is provided with all MAP messages in the network 10 and will determine initially whether each message is an SMS message, and if not, forward the message to the desired destination. For SMS messages, the application 42 will determine whether the MAP SMS message is spam, and if so, refrain from forwarding such to the SMSC 18, thereby reducing the amount of spam-related traffic in the network 10 and shielding users from receipt of such SMS spam. MAP SMS messages that are scrutinized and found to be non-spam (good) are forwarded by the ASA 42 to the desired destination using normal SMS processing, for example, via the SMSC 18, MSC 12, or other network element(s). Thus, the ASA 42 receives the MAP SMS messages and classifies these as either spam or good, and thereafter selectively provides good MAP SMS messages to the SMSC 18 for delivery to the corresponding destinations, and refrains from providing spam MAP SMS messages to the SMSC. In the exemplary embodiment, moreover, messages which are considered spam (based on the application of the anti-spam filtering in the ASA 42), are blocked and may be discarded or persisted (stored) for further operator intervention via the computer 48 or other means. Thus, the ASA 42 will not pass any spam SMS messages to the SMSC 18, whereby any such SMPP SMS messages sent by the SMSC 18 to the ESME 32 are deemed to me good (spam-free) whereby the ASA 18, even though acting as a proxy between the ESME 32 and the SMSC 18, will simply pass these SMS SMPP messages from the SMSC 18 to the ESME 32 without the need for spam filtering processing. FIG. 4B illustrates this operation 150 of the ASA 42 with respect to SMPP SMS messages received from the SMSC 18 of the wireless network 10 which are destined for the ESME 32. Such messages are received at 152 and forwarded to the ASA 42 of the network server 40 at 154. The ASA 42 then forwards the messages to the ESME without spam filtering at 156.

Referring now to FIGS. 1-4A, the exemplary ASA 42 performs two-stage spam filtering of SMPP SMS messages received from the ESME 32. As shown in FIGS. 1-3, the ASA 42 in one embodiment is implemented as multiple components on the network server 40, including a first anti-spam control component (ACC) 44 that performs first stage spam filtering via a first stage analysis component 44b to classify the SMPP SMS messages from the ESME as spam, suspected spam or good, as well as the component 44a serving as a proxy for one or more network short message service centers (SMSC) 18. The exemplary ASA 42 also comprises second anti-spam data component (ADC) 46 that performs second stage spam filtering on suspected spam messages to classify these as spam or good. In the illustrated example, moreover, the ADC 46 implements a rules engine with one or more sets of provisioned rules 46a and a message database 46b for buffering the SMPP messages being filtered and for persisting identified spam or suspected spam messages, along with a data store for provisioned subscriber data 46c and a second stage spam analysis component 46d.

The ASA 42 supports spam filtering for SMPP SMS messages in the IP network 30 and functions like a proxy server to the SMSC 18. The ASA receives incoming messages from the ESMEs 32, performs spam filtering on the SMS messages and forwards the spam-free messages to the SMSC 18. In addition, any incoming messages from the SMSC 18 are forwarded to the ESME 32. If an SMS SMPP message from the ESME 32 is identified as suspect or spam, a configurable set of actions are taken by the ASA 42 to further handle the message, such as being either delivered to it's destination using the same network protocol as the incoming message if no configurable action is required, or the suspected spam is persisted for further analysis. This subsequent analysis is particularly relevant for SMPP SMS messages that carry text, such as SMPP submit_sm messages. During the subsequent analysis the message is analyzed against the characteristics of known spam messages to decide if the message is spam. If the message is analyzed to be SPAM, the message is not delivered and put into the known pool of SPAM messages. If, however, the message is not spam, the message is forwarded to the SMSC 18 using the SMPP protocol so that the SMSC 18 can initiate the message termination procedure.

In one preferred implementation, the first stage spam analysis component 44b provides for spam filtering using a rules engine that processes user or service provider configurable rule sets 46a to identify the received SMPP SMS messages as either spam, good, or suspect, and the second stage spam analysis component 46d performs Bayesian filtering to classify the suspected spam messages as spam or good. Moreover, the exemplary ASA 42 is preferably operative to selectively perform configurable acknowledgment processing, configurable alarm processing, and/or configurable pattern matching with respect to suspected spam in the second spam analysis stage via component 46d, wherein such operations may be configurable by a user or a service provider to tailor the SMS spam filtering service. For instance, a user or service provider may allow a user to define patterns of suspected text strings for filtering in the second stage component 46d, as well as allowing configuration of how suspected spam messages are acknowledged and configurable alarm behavior. Moreover, the second stage analysis component 46d may be further configurable by users or service providers in order to customize the handling of suspected spam with respect to other filtering decisional logic, such as whether to relay, block, discard, or otherwise save or persist suspected spam in the ASA 42.

The ACC 44 provides network connectivity for the SMPP SMS messages 500 and handles spam checking for SMS, wherein the ADC 46 provides storage and analysis of suspect spam SMPP messages, as well as operator interfaces, SMS forwarding capability (through the ACC 44), distribution of SPAM check rules/criteria/thresholds, and synchronization of dynamic data among the ACCs 44. These service application packages 44, 46 can be deployed in a variety of ways on one or more network servers or entities 40, including but not limited to single node implementations in which the ASA 42 is deployed on a single server 40 with the ACC 44 and ADC 46 deployed on the same node for low-end configurations, mated pair configurations in which the ASA 42 is deployed on a pair of network nodes or entities with ACCs 44 and ADCs 46 on both nodes and with the data persisted by the ADC 46 being replicated between the two nodes in the pair for providing a low-end configuration with high availability, and/or distributed configurations with the ASA 42 deployed in a distributed manner to provide high capacity and reliability, wherein the ADC 46 may be deployed on a mated pair of network nodes and the ACC 44 can be deployed on nodes in an N+K configuration in one example.

The ASA 42 performs spam filtering in two stages, where the first is referred to as 'Spam Check', and the second is referred to as 'Spam Analysis'. In the first stage, an SMPP SMS message is checked for potential spam conditions based on spam checks configured in the ASA 42 for which the analysis can be performed completely based on information in the message and certain data configured in the application. Based on these spam checks via components 44b and 46d (FIGS. 2 and 3), a SMPP message can be marked as suspect, spam or good. If the message is determine to be good, the ASA 42 forwards the message to the desired destination via the SMSC 18. If a message is identified as spam in the first stage, e.g. from a forbidden source or other configured first stage spam filtering condition, the ASA 42 persists the message as spam and need not perform second stage analysis of the message content. For such messages, moreover, a configurable set of actions may be taken by the ASA 42. If a message is found to be suspected spam in the first analysis stage, e.g., a volume threshold has been exceeded for the source network, the second spam analysis is performed to determine if the message is really spam. For such suspected messages, a configurable set of actions would be taken by the application 42.

The exemplary ASA 42 uses a rules engine to execute the first stage spam check rules for each SMPP SMS message in which a configurable rule set 46a is executed, and wherein a rule set can be created to execute a number of rules for a message. The logic for the execution of different rules is specified in the rule set. Each individual rule in a rule set can be either written in the rule set itself or can involve a functional call to the implementation in the application 42. If a rule can be written completely using the data passed during rule set execution then it is specified in the rule set itself. But if a rule evaluation requires data provisioned in the ASA 42 or some dynamic data maintained by the application 42, then the rule would be implemented using a function call implemented in the ASA 42. The rules engine of the ASA 42 provides the ability to implement logic for the implementation of a rule set for each message, thereby enabling configurability of the rule set for each message. The ASA 42 provides a default rule set for each message, with the ability to create further rule sets based on a particular customer requirement without necessitating ASA modification. The second stage spam analysis operates on suspected spam SMPP SMS messages which have been persisted and can provide a configurable response to a suspect message without second stage filtering. The ASA 42 may maintain a repository of the known spam messages, which were previously received and identified as spam, wherein content of a new suspect SMS message is analyzed against the contents of the known spam SMS messages to determine if the suspect message is spam. If the new message is thus identified as spam, it is persisted in the pool of known spam messages. However, if the new message is determined to be good in the second stage, the message is forwarded to the SMSC 18.

The ASA 42 may employ a model for different classes of spam messages and their characteristics that can be derived by periodic analysis of the contents of known spam messages. This periodic analysis process is also referred to as 'training' of the model. This periodic training also helps determine outlier patterns that are likely to appear in a spam message. These patterns are used in configurable pattern matching filters in the spam filtering to detect a suspected spam message to help reduce the likelihood of blocking good messages during the first stage, e.g., if certain network based threshold has been violated by a source network, the use of the pattern matching can help avoid blocking good messages from that network. Any new suspect SMPP message from the ESME 32 can be compared in the ASA 42 against the model to determine if it belongs to any of the classes of the spam messages. If so, the suspect message is classified as spam and persisted among its category, and if not, the message is forwarded to the SMSC 18. The ASA 42 also supports configurable data that can be used to implement configurable spam filtering for SMPP messages from the ESME 32, and may maintain dynamic data based on the network traffic that are used during spam filtering, wherein the rules engine may use such dynamic data.

Exemplary configuration data for the ASA 42 may comprise thresholds for network traffic, allowed/forbidden networks, and certain other global data required for spam filtering. Such data may generally be categorized in one of several exemplary categories, including network based thresholds for messages (e.g., thresholds for different network groups for the volume of individual messages received from each network belonging to the group, on a periodic basis, such as hourly, daily etc, as well as a threshold for a message across network in any given interval, e.g., hourly, daily etc.). Another category of configuration data is per-sender thresholds for messages, such as thresholds configured for messages coming from specific sources or a group of senders. Yet another category includes Forbidden/Allowed/Trusted Networks, wherein such data is configured to identify specific networks that are allowed, barred, or trusted for sending SMS messages. As one possible default, if a specific network is not configured in this data category, messages are allowed from that network, wherein messages from such a source would still be subjected to the other types of spam filtering (e.g., volume based checks, etc.). For a network is configured as trusted, the ASA may forego further spam filtering for any message coming from these trusted networks and thus are classified as good. If a network is barred, the message from that network is marked as spam. The category configuration data may be manually configurable by an operator, and/or the ASA 42 may be operative to automatically manage the state of a network based on certain criteria.

Another category of configurable data includes adjacency thresholds used to configure the threshold for volume of messages allowed for a specific area of the home SS7 network 10. This facilitates detection in the ASA 42 of message bursts that can be generated when mass SMS messaging is in progress, wherein operators may configure time intervals for taking measurement related to this spamming technique. The ASA 42 can also enable/disable pattern matching checks on a per network basis, and can allow an operator to manually enable/disable pattern matching checks for a given network, thereby facilitating a balance between activating pattern matching when required versus foregoing expensive pattern matching checks. The ASA 42, for example, may dynamically activate/deactivate pattern matching checks based on detection of suspect or spam messages. Thus, if there are no suspect or spam messages during a specific period, the ASA 42 can automatically de-activate the pattern matching checks for specific networks. Similarly, when the ASA 42 determines that spamming is perhaps in progress, by detecting suspect/spam messages during a specific period, the ASA 42 can activate the pattern matching checks to filter out spam from good. As an example, when volume based thresholds are exceeded from a network, activation of the pattern matching checks would help determine which ones are spam and which ones are good so that good messages from that network are not unnecessarily blocked as spam.

The configuration data may also include user or operator configurable patterns for the pattern matching checks. In this case, the ASA 42 maintains a configurable set of patterns to be used in the pattern matching filters during the spam filtering, wherein the pattern list may be initially determined and/or updated based on the training of the spam analysis rules engine in the application 42. These automatically generated patterns are the tokens in the training data set that are most likely to occur in spam messages. An operator or user, moreover, can also configure additional patterns beyond those automatically determined by the application, and the automatically generated patterns are preferably updated every time the training is executed for the spam analysis rules engine. The configurable data may also include a spam filtering rule-set associated with a message, whereby a rule-set can be specified for execution for each message in the first filtering stage in order to check whether the message is suspect spam. In addition, the ASA 42 allows configuration of actions taken for suspected spam and spam SMS messages, which may be defined on a per message type basis, PLMN, and/or a suspect/spam reason basis. In one possible implementation, the ASA 42 allows configuration of actions such as: override the suspect decision and forward the message to the SMSC 18; generate an alarm; analyze the content of the message using the second stage analysis for SMS messages that carry text and that are definitively classified as spam during the first stage itself; enable pattern matching filter for any subsequent incoming messages that carry text; return a success response to the client, with configurable return information; close the connection with a configurable error response; and close the connection without an acknowledgment, although other actions are possible beyond these specific examples.

Another type of configuration data includes network related configuration data, wherein the ASA 42 allows configuration of data such as ASA's home network address, forwarding SMSC addresses, etc. The ASA 42 also supports configuration data for message request/response, which may be used when sending a response to a message or when invoking a message on a network element. This helps ensure that the network related information in the response/request message is as required for a customer network so as to correctly route the message to the intended destination. Such data could include message response data including configurable values for parameters in an outgoing response, e.g., calling party address information, status of the request, any cause indication, etc., which can be defined for each message type for which the ASA 42 can be required to send a response back to the calling party, as well as message forwarded to nodes data for supporting relay or bridge capability.

The ASA 42 can also maintain dynamic traffic data to evaluate spam check rules for the SMS messages, including counters that are operable during a specific interval, e.g., hourly, daily, monthly etc. Examples include per network group counters indicating the number of messages received from a specific network group within a specific period, which can be maintained separately for each message type; per message type counters to provide counts for a specific message type across all the networks during a specific period; adjacency counters that provide totals for messages received for a specific network prefix, e.g., numbers of messages sent to subscribers in a specific area to indicate whether mass spamming is in progress targeting a specific area; and per-sender type counters providing the number of messages received from a specific sender within a specific period. The counters, moreover, can be synchronized for multiple spam-check nodes by the ASA 42.

The ASA 42 connects to the SMSC 18 and acts as a proxy server for the SMSCs 18 in the wireless network 10 and provides the protocol level support for interfacing with ESMEs 32 and SMSC 18. The ACC 44a manages the mapping of the ESME initiated sessions to the corresponding SMSC sessions established with the SMSC 18, wherein the presence of the ASA 42 between the ESME 32 and the SMSC 18 is essentially transparent to the ESME 32 and to the SMSC 18 as it would simply be accessed by the ESME 32 like an SMSC 18 using a specific IP and Port number assigned to it. The processing logic and message flow for the SMPP messages is dependent on the type of messages, such as message submissions from the ESME 32 to the SMSC 18 and message delivery from the SMSC 18 to the ESME 32, wherein the following description is directed to message submissions for SMPP SMS messages and it is assumed that the appropriate SMPP bind sessions have been properly activated between the ESME 32 and the ASA 42 and between the ASA 42 and the SMSC 18 for submission of SMS SMPP messages.

The SMPP protocol is used between the ESME 32 and the SMSC 18 to exchange SMS related messages, and requires an SMPP session to be established before the SMS messages can be exchanged. In addition to messages carrying text, the SMPP protocol allows for other messages that are needed to support the interfacing between the ESME 32 and the SMSC 18. The ASA 42 operates as a proxy SMSC server that allows the ESMEs 32 and SMSCs 18 to indirectly exchange messages with each other, wherein the ASA 42 appears as an SMSC to the ESME 32 and as an ESME to the SMSC 18. In this regard, the ASA 42 is configured to allow SMPP connections from ESMEs 32 that would normally directly connect to the SMSC 18 and the ESME 32 connects to the ASA 42 instead of connecting directly to the SMSC 18, wherein the real IP address and SMPP port number of the SMSC 18 is effectively from the ESME 32. Instead, the ESME 32 is provided with the IP address and port number for the ASA 42 for SMPP connection, and the ESME 32 uses the same interface and protocol with the ASA 42 as if connecting directly to the SMSC 18. In operation as a proxy server, the ASA 42 forwards the ESME-initiated messages (e.g., bind_transceiver, 'submit_sm', etc. SMPP PDUs) to the SMSC 18 and forwards the responses from the SMSC 18 to the ESME 32. The ASA 42, moreover, receives the messages initiated by the SMSC 18 (e.g., 'deliver_sm' SMPP PDU) and forwards these to the ESME 32 and also forwards the response from the ESME 32 to the SMSC 18. The ESME 32 establishes an SMPP session with the ASA 42 before sending or receiving any SMS messages, wherein the ASA 42 supports the SMPP protocol over a TCP/IP connection in one embodiment, with the ESME 32 opening a TCP/IP socket connection with the ASA 42 and performing an appropriate bind operation for the SMPP session. The ASA 42 identifies the corresponding SMSC to which the ASA 42 can establish a corresponding SMPP session on behalf of the ESME 32. Once the end-to-end SMPP session has been established, the SMS messages can be exchanged between the ESME 32 and the SMSC 18 via the ASA 42.

The network server 40 handles the TCP/IP socket connection from the ESME 32 and opens the corresponding TCP/IP socket connection to the SMSC 18. Once the socket connection has been established by the ESME 32, the server 40 can receive the SMPP PDU from the ESME 32 and forwards these to the ASA 42. The ASA initiates corresponding action on either the SMSC 18 or the ESME 32. In particular when the 'bind_transmitter' or 'bind_transceiver' PDU is received from the ESME 32, the ASA 42 verifies if there is a corresponding SMSC 18 configured for the ESME 32. Once validated, the ASA 42 initiates the same bind PDU to the SMSC 18 by opening a TCP/IP socket connection to the SMSC 18 and sending the SMSC 18 the bind PDU to establish the SMPP sessions. When a response is received from the SMSC 18, the network server 40 forwards it to the ASA 42, and the ASA 42 initiates a 'bind_transmitter_resp' or 'bind_transceiver_resp' to the ESME 32 and the end-to-end SMPP session is established. Subsequently, ESME and SMSC can originate various SMPP PDUs to the server 40 over the established TCP/IP socket connection. The server 40 responds directly to some of the PDUs (e.g., 'enquire_link') and forwards the rest to the ASA 42 for appropriate handling. At any time if the ESME or SMSC TCP/IP socket connection drops, the server 40 notifies the ASA 42 so that the ASA 42 can take appropriate action (e.g., close the corresponding ESME/SMSC SMPP session and cleanup of the mapping data). In some cases, the server 40 may respond directly to the SMSC 18, such as 'unbind' PDU, and may notify the ASA 42 to take appropriate action (e.g., 'unbind' PDU to the SMSC 18 and cleanup of the mapping data). The ASA 42 maintains the session mapping between the ESME 32 and the SMSC 18 using the SMPP session id assigned by the server 40 to the SMPP session from the ESME 32 and to the SMSC 18. Also, when an SMPP is invoked by the ESME 32 or the SMSC 18, a message_sequence is assigned per the SMPP protocol. For PDUs that need to be transmitted end-to-end, the ASA 42 maintains the message_sequence mapping between the ESME and SMSC SMPP PDUs so that response from one can be forwarded to the other with the correct message_sequence context. This message sequence mapping is cleared in the ASA 42 once the SMPP PDU (request and response) has been transmitted end-to-end. However, the SMPP session mapping info is cleared only after the two SMPP sessions (from the ESME 32 and to the SMSC 18) has been terminated. When the ASA 42 receives a PDU carrying SMS message (e.g., 'submit_sm') from an ESME 32, the ASA 42 can perform spam filtering, if configured by the operator, to verify whether the message is spam or good. Depending on the result, the ASA 42 handles the message appropriately. If the message is spam-free, the ASA 42 forwards the message to the SMSC 18 over the SMPP session established corresponding to the ESME 32 SMPP session. The response (e.g., 'submit_sm_resp' PDU) received from the SMSC 18 would be forwarded to the ESME 32. If the ESME 32 initiated a bind_transceiver session, it would be possible for the SMSC 18 to initiate delivery of SMS messages waiting for the ESME 32, wherein the ASA 42 does not need to perform the spam filtering of such messages originated by the SMSC 18.

Referring to FIG. 4A, as set forth above, the ASA 42 simple forwards SMS SMPP messages from the SMSC 18 to the ESME 32 as these have already been cleared in the network 10. With respect to SMPP SMS messages from the ESME 32 to the SMSC 18, FIG. 4A provides a method 100 for filtering spam SMS SMPP messages according to further aspects of the invention. The ASA 42 receives the SMS message from the ESME 32, and processes it to determine if it is spam. If the message is not spam (good), the message is forwarded to the SMSC 18, with the response being collected from the SMSC 18 and forwarded to the ESME 32. If, however, the message is determined to be spam by the ASA 42, the message is not forwarded to the SMSC 18 and a configurable response is provided to the ESME 32, whereby such messages never enter the wireless network 10. Once the SMPP messages have been processed in the ASA 42 to filter out the spam or suspect messages, the ASA 42 may apply configurable logic to handle them, such as application of certain predefined criteria to determine a set of actions that can be taken on such messages, including determining should be done with the suspect or spam SMPP SMS message (e.g., discard, persist, analyze, etc.), how and whether to acknowledge the sender of the suspect or spam SMPP SMS message; whether and what type of an alarm should be generated when suspect or spam Messages are detected in the ASA 42; and whether to automatically activate sophisticated pattern matching logic for further refining the criteria for detection of suspect or spam SMS SMPP messages.

While the exemplary method 100 is illustrated in FIG. 4A and described hereinafter in the form of a series of acts or events, it will be appreciated that the various methods of the invention are not limited by the illustrated ordering of such acts or events except as specifically set forth herein. In this regard, except as specifically provided hereinafter, some acts or events may occur in different order and/or concurrently with other acts or events apart from those acts and ordering illustrated and described herein, and not all illustrated steps may be required to implement a process or method in accordance with the present invention. The illustrated method 100 and other methods of the invention may be implemented in hardware, software, or combinations thereof, in order to provide SMPP SMS message filtering services in association with a wireless network, wherein these methods can be practiced in hardware and/or software of the above described ASA 42 or other forms of logic, hardware, or software in any single or multiple entities operatively associated with a wireless network 10, wherein the invention is not limited to the specific applications and implementations illustrated and described herein.

At 102 in FIG. 4A, an SMPP message is received from the ESME 32 and is routed to the network server 40 at 104 and analyzed at 106 by the ASA 42 thereof. The SMPP messages related to SMS may be further validated at 106 to see if spam filtering is configured for them, and if so, the message is processed further at 110 to test for spam. In particular, SMPP submit_sm messages are processed to check for spam in the ASA 42 using a two stage process 110. First stage spam filtering is performed at 112 to classify the received SMPP SMS message as good, spam, or suspected spam at 114. Identified spam (SPAM at 114) is discarded or stored (e.g., persisted) at 124, whereas good messages (GOOD at 114) are provided at 116 to the destination SMSC 8. Suspected spam SMPP messages (SUSPECT at 114) undergo second stage spam filtering at 120 to classify the suspected messages as either spam or good at 122. Good messages (NO at 122) are provided to the destination via the SMSC 18 at 116 as described above, whereas identified spam messages (YES at 122) are discarded or stored at 124. In one embodiment, the second stage spam filtering at 120 comprises performing Bayesian filtering to classify the suspected spam messages as spam or good. In the illustrated example, for SMPP messages comprising data and text, the exemplary first stage spam filtering is performed at 112 on both the data and the text, and the second stage spam filtering at 120 is performed on the text. In this embodiment, moreover, the second stage spam filtering at 120 may include selectively performing one or more of configurable acknowledgment processing, configurable alarm processing, and configurable pattern matching. In this manner, identified spam SMS from the ESME 32 is prevented from propagating into the wireless network 10, thereby alleviating customer dissatisfaction and minimizing undesirable SMS spam-related traffic in the network 10.

Figure 5A:
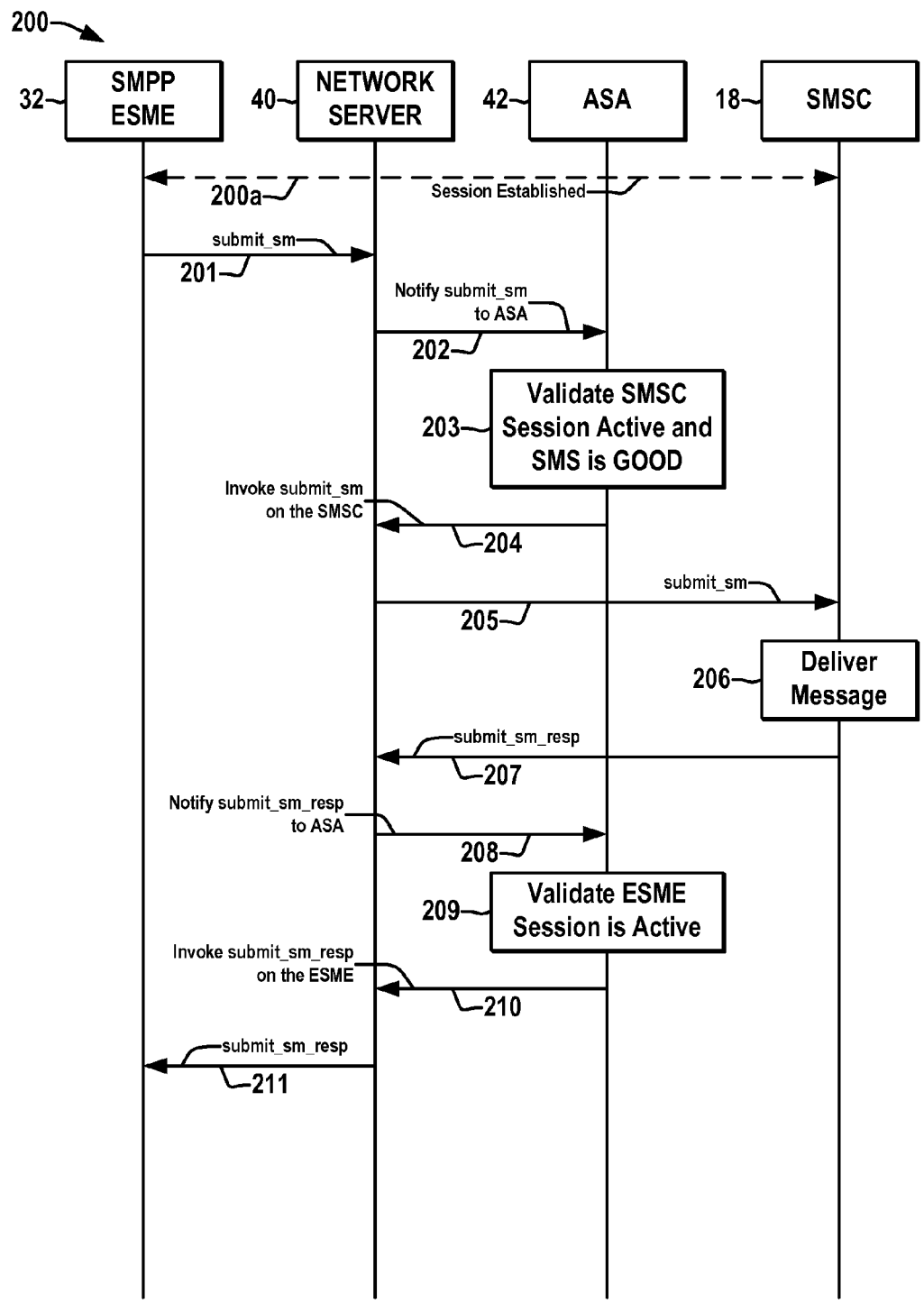
FIG. 5A depicts a message flow diagram illustrating processing of an exemplary SMPP SMS message from an ESME to an SMSC of a wireless network including session validation and spam filtering.
Figure 5B:
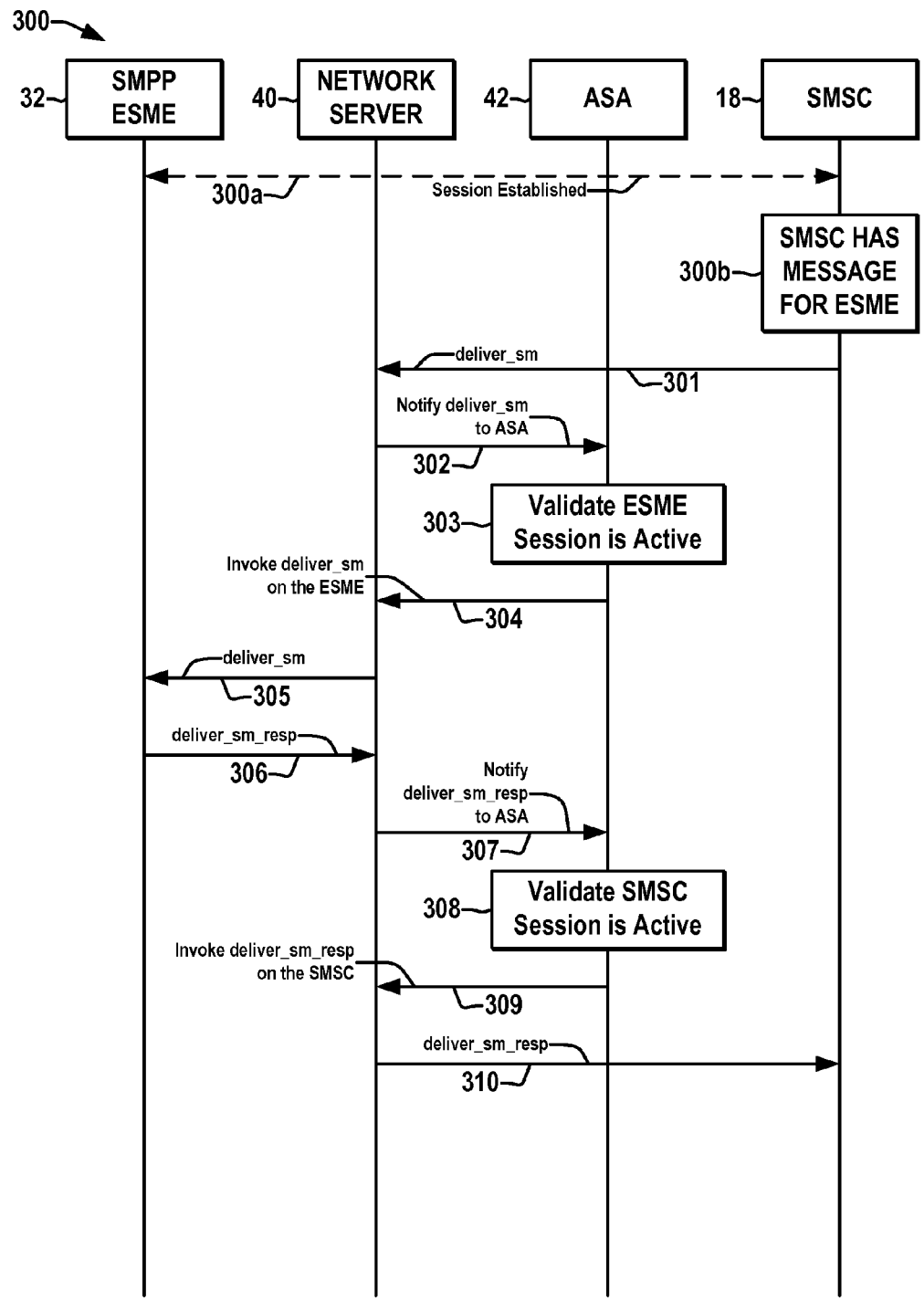
FIG. 5B is a message flow diagram showing processing of an SMPP SMS message from the network SMSC to the ESME.

FIG. 5A provides a message flow diagram 200 illustrating processing of an exemplary SMPP SMS message 201 from an ESME 32 to an SMSC 18 of a wireless network 10 including session validation and spam filtering at 203, and the message flow diagram 300 of FIG. 5B shows processing of an SMPP SMS message from the network SMSC 18 to the ESME 32 with no filtering. A bind session is established at 200a between the ESME 32 and the SMSC 18 (with the ASA 42 as a proxy therebetween) and the ESME 32 provides a submit_sm SMPP SMS message 201 to the network server 40. The server 40 then provides a notify submit_sm to the ASA 42 at 202 and the ASA 42 validates the SMSC session as active and performs the above described two stage spam filtering at 203. For SMPP SMS messages determined to be spam-free at 203, the ASA 42 provides an invoke submit_sm on the SMSC 18 to the network server 40 at 204 and the server 40 sends the submit_sm SMPP message to the SMSC 18 at 205. The SMSC 18 then delivers the SMPP SMS message to the desired destination at 206 using appropriate messaging and processing in the wireless network 10. The SMSC 18 then provides a submit_sm_resp response message to the server 40 at 207 and the server 40 provides a notify submit_sm_resp response to the ASA 42 (acting as a proxy) at 208. The ASA 42 then validates that the ESME session is active at 209, and if so, provides the invoke submit_sm_resp on the ESME at 210 to the server 40, which then sends the corresponding submit_sm_resp to the ESME 32 at 211.

Referring briefly to the message flow 300 in FIG. 5B, as set forth above, the exemplary ASA 42 need not perform any spam filtering on SMS SMPP messages from the SMSC 18 to the ESME 32. In FIG. 5B, a session is established with the ASA 42 as a proxy between the ESME 32 and the SMSC 18 at 300a with the SMSC 18 having an SMS SMPP message for the ESME 32 at 300b. The SMSC 18 sends a deliver_sm message to the network server 40 at 301, which sends a notify deliver_sm to the ASA 42 at 302. The ASA 42 then validates the ESME session as being active at 303 and sends an invoke deliver_sm on the ESME at 304 to the sever 40. The server 40 then sends a deliver_sm message at 305 to the ESME 32, which responds with a deliver_sm_resp message 306 to the server 40. The server 40 sends a notify deliver_sm_resp to the ASA at 307 which validates at 308 that the SMSC session is active. The ASA 42 then invokes a deliver_sm_resp on the SMSC to the server 40 at 309, and the server 40 sends the deliver_sm_resp to the SMSC 18 at 310.

Figure 6:
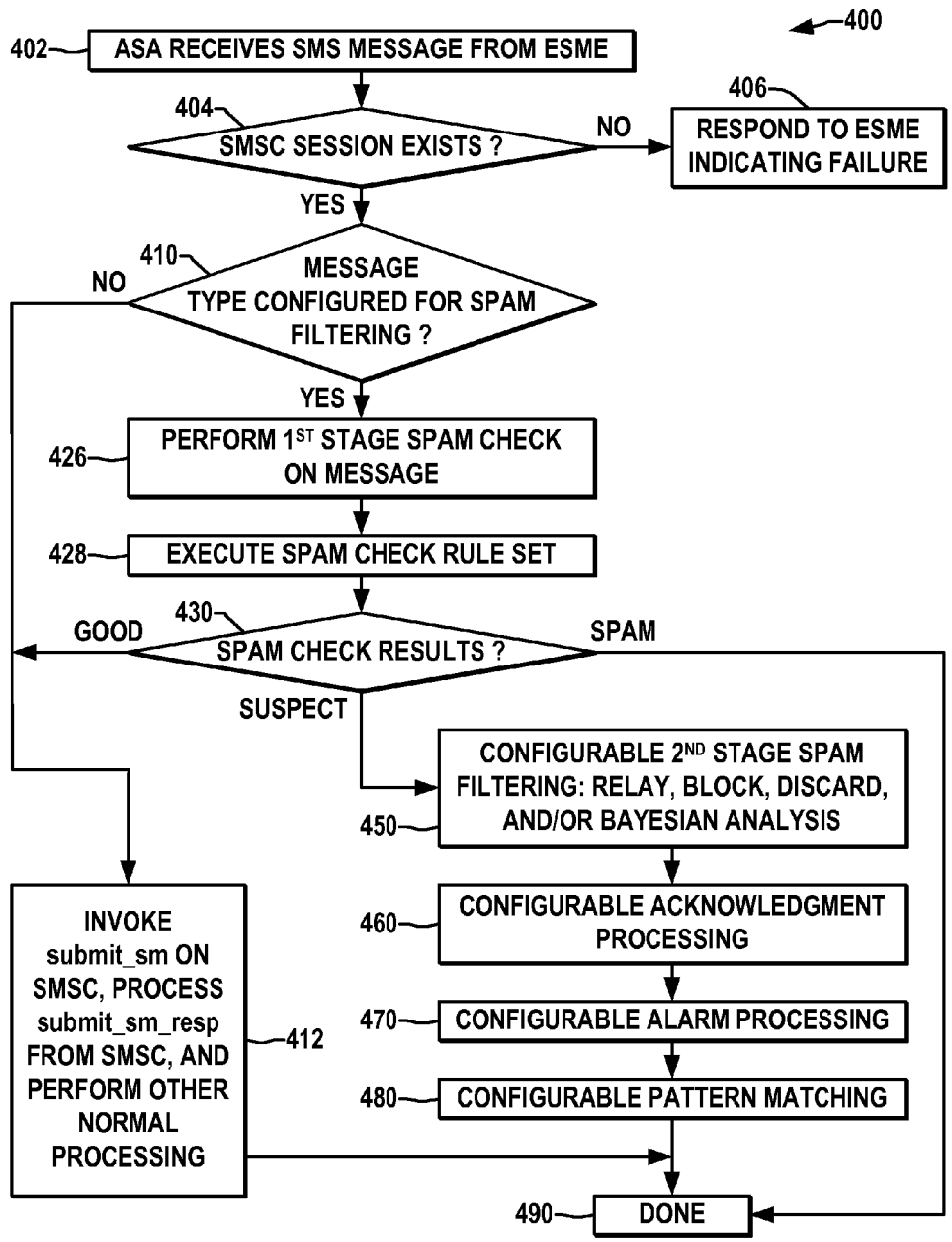
FIG. 6 is a flow diagram illustrating exemplary two-stage spam filtering using the exemplary SMPP spam filtering systems and methods.

Referring now to FIG. 6, a simplified flow diagram 400 illustrates exemplary two-stage spam filtering in the ASA 42, beginning at 402 with receipt of an SMPP SMS message by the ASA 42. At 404, a determination is made as to whether an SMSC session exists. If not (NO at 404), the process 400 proceeds to 406 to respond to the ESME indicating a failure. If the session is active (YES at 404), a determination is made at 410 as to whether the message type (e.g., SMPP submit_sm) is configured for spam filtering. If not (NO at 410), the process proceeds to 412 and the ASA 42 provides an invoke submit_sm on the SMSC to the server 40 (e.g., at 204 in FIG. 5A above) and processes a submit_sm_resp from the SMSC 18 (e.g., 208 in FIG. 5A) and performs other normal processing to provide the SMS message to the SMSC 18 as a proxy before the process 400 is done at 490. If, however, the message type is configured for spam filtering (YES at 410), first stage spam filtering processing is performed at 426, with the configured spam check rule set being executed at 428, and a determination is made at 430 as to whether the message is spam, suspected spam, or good SMS. If the message is found to be good (GOOD at 430), the process proceeds to 412 as described above for provision of the good SMS message to the appropriate destination via the SMSC 18. For messages determined at 430 to be spam (SPAM at 430), the process 400 proceeds to 490 without delivery of the spam SMS. For suspected spam messages (SUSPECT at 430), the configurable second stage spam checking is done at 450, whereat the application 42 can be configured to either relay, block, discard, or further analyze the suspected message using Bayesian filtering analysis in one implementation. Once the second stage is completed at 450, the message may undergo any configured acknowledgment processing at 460, configured alarm processing at 470, and/or configurable pattern matching at 480, and if spam, the message is discarded or persisted before the process 400 ends at 490.

Figure 7A:
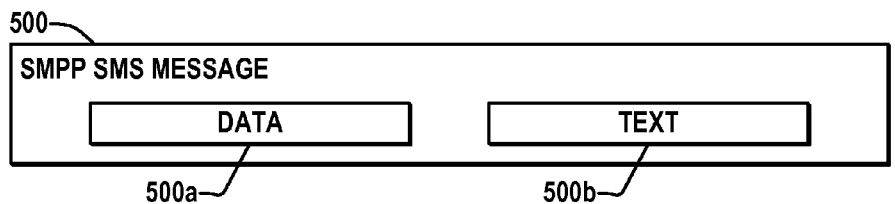
FIG. 7A is a simplified schematic diagram illustrating an exemplary SMPP SMS message having data and text portions.
Figure 7B:
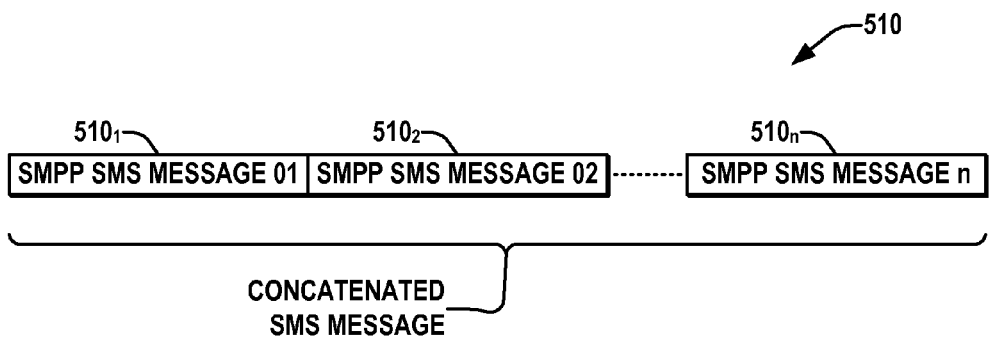
FIG. 7B is a simplified schematic diagram illustrating an exemplary concatenated SMPP SMS message.
Figure 7C:
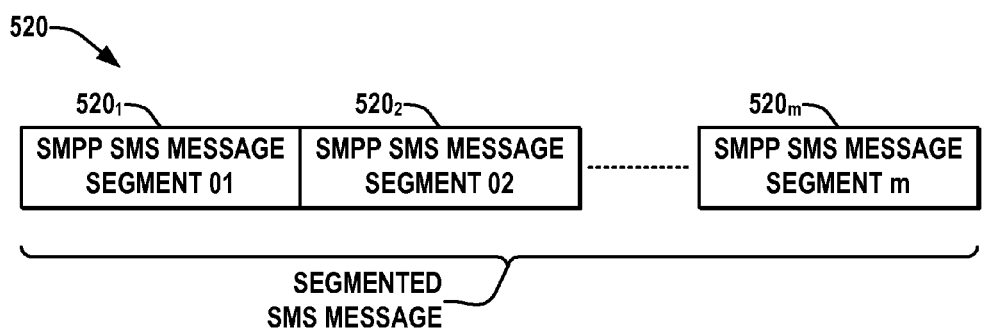
FIG. 7C is a simplified schematic diagram illustrating a segmented concatenated SMPP SMS message.

Referring now to FIGS. 7A-7C, the ASA 42 is operative to process SMPP messages 500 as shown in FIG. 7A which may include an optional data portion 500a as well as a text portion 500b. As shown in FIG. 7B, moreover, the system can support concatenated SMPP SMS messages 510 including a plurality of SMS messages $510_{01}, 510_{02}, \ldots, 510_n$. In one mode of operation, the ASA 42 is configurable to individually classify the plurality of SMS messages $510_{01}, 510_{02}, \ldots, 510_n$ of the concatenated message 510 as suspected spam, spam, or good. In another possible embodiment, the ASA 42 is configurable to collectively classify the messages $510_{01}, 510_{02}, \ldots, 510_n$ of the concatenated message 510 as suspected spam, spam, or good. In one example, if any of the individual messages $500_{01}, 500_{02}, \ldots, 500_n$ are found to be spam, the entire concatenated message 510 is classified as spam. FIG. 7C shows another possibility, in which the ASA 42 can process a segmented concatenated SMPP SMS message 520 wherein the message 520 is received in pieces or segments $520_{01}, 520_{02}, \ldots, 520_m$ from the network 10. In this case, the ASA 42 is operative when one or more segments of the concatenated message 520 are not received in a timely fashion from the SS7 network 10 to classify the message 520 as spam and to process the message accordingly. In another configurable mode of operation, the ASA 42 performs the spam filtering on the segments that are received, and to the extent possible, classifies the segmented concatenated message 520 as spam, spam, or good based on the analysis of the received ones of the segments $520_{01}, 520_{02}, \ldots, 520_m$.

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for filtering spam SMS SMPP messages from an External Short Messaging Entity (ESME) to an SMSC associated with a wireless network, the method comprising:
receiving SMPP SMS messages from the ESME;
providing the SMPP SMS messages to an anti-spam application running on a network element;
classifying SMPP SMS messages as spam or good prior to providing the SMPP SMS messages to the SMSC;
providing good SMPP SMS messages to the SMSC of the wireless network;
refraining from providing spam SMPP SMS messages to the wireless network;
wherein the SMPP SMS messages include at least one concatenated message including a plurality of SMS messages; and
wherein at least some segments of the at least one concatenated message are not received, and wherein the received segments of the at least one concatenated message are classified as spam.

2. The method of claim 1, wherein classifying the SMPP SMS messages comprises: performing first stage spam filtering to classify the SMPP SMS messages as spam, suspected spam or good, and performing second stage spam filtering on suspected spam messages to classify the messages as spam or good.

3. The method of claim 2, wherein performing first stage spam filtering includes: storing the SMPP SMS messages in a message database associated with the anti-spam application, and evaluating a set of rules to classify the SMPP SMS messages as suspected spam or good; and wherein performing second stage spam filtering comprises performing Bayesian filtering to classify the suspected spam messages as spam or good.

4. The method of claim 2, wherein the SMPP SMS messages comprise data and text, wherein the first stage spam filtering is performed on the data and the text, and wherein the second stage spam filtering is performed on the text.

5. The method of claim 2, wherein performing second stage spam filtering comprises selectively performing at least one of configurable acknowledgment processing, configurable alarm processing, and configurable pattern matching.

6. The method of claim 1, wherein the plurality of SMS messages of the concatenated message are individually classified as spam or good.

7. The method of claim 1, wherein the plurality of SMS messages of the concatenated message are collectively classified as spam or good.

8. The method of claim 1, wherein at least some segments of the at least one concatenated message are not received, and wherein the received segments of the at least one concatenated message are classified as spam or good.

9. A method for processing SMPP SMS messages between an External Short Messaging Entity (ESME) and an SMSC associated with a wireless network, the method comprising:
classifying SMPP SMS messages from the ESME to the SMSC as spam or good and selectively providing the good messages to the SMSC; and
providing all SMS SMPP messages from the SMSC to the ESME;
wherein the SMPP SMS messages include at least one concatenated message including a plurality of SMS messages, wherein at least some segments of the at least one concatenated message are not received, and wherein the received segments of the at least one concatenated message are classified as spam.

10. The method of claim 9, wherein classifying the SMPP SMS messages comprises: performing first stage spam filtering to classify the SMPP SMS messages as spam, suspected spam or good, and performing second stage spam filtering on suspected spam messages to classify the messages as spam or good.

11. The method of claim 10, wherein performing first stage spam filtering includes: storing the SMPP SMS messages in a message database associated with the anti-spam application, and evaluating a set of rules to classify the SMPP SMS messages as suspected spam or good; and wherein performing second stage spam filtering comprises performing Bayesian filtering to classify the suspected spam messages as spam or good.

12. A system for filtering spam SMS SMPP messages from an External Short Messaging Entity (ESME) to an SMSC associated with a wireless network, comprising:
a network element operatively coupled with the wireless network to receive SMS SMPP messages from the ESME to the SMSC; and
an anti-spam application running on the network element to receive the SMPP messages from the ESME and to classify the SMPP SMS messages as spam or good prior to providing the SMPP SMS messages to the wireless network, the anti-spam application operative to selectively provide good SMPP SMS messages to the SMSC of the wireless network and to refrain from providing spam SMPP SMS messages to the wireless networks;
wherein the SMPP SMS messages include at least one concatenated message including a plurality of SMS messages, wherein at least some segments of the at least one concatenated message are not received, and wherein the anti-spam application classifies received segments of the at least one concatenated message as spam.

13. The system of claim 12, wherein the anti-spam application comprises:
a first component that performs first stage spam filtering to classify the SMPP SMS messages from the ESME as suspected spam, spam, or good; and
a second component that performs second stage spam filtering on suspected spam messages to classify the messages as spam or good.

14. The system of claim 13, wherein the anti-spam application further comprises a message database for storing the SMPP SMS messages, and a set of rules used by the first component to classify the SMPP SMS messages as suspected spam, spam, or good; and wherein the second component performs Bayesian filtering to classify the suspected spam messages as spam or good.

15. The system of claim 12, wherein the anti-spam application comprises a message database for storing the SMPP SMS messages.

16. The system of claim 12, wherein the anti-spam application is operative to selectively perform at least one of configurable acknowledgment processing, configurable alarm processing, and configurable pattern matching.

17. The system of claim 12, wherein the SMPP SMS messages include at least one concatenated message including a plurality of SMS messages.

18. The system of claim 12, wherein the anti-spam application refrains from filtering SMPP SMS messages from the SMSC to the ESME.

* * * * *

UNITED STATES PATENT AND TRADEMARK OFFICE
CERTIFICATE OF CORRECTION

PATENT NO. : 7,640,030 B2  Page 1 of 1
APPLICATION NO. : 11/427359
DATED : December 29, 2009
INVENTOR(S) : Cai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Twenty-first Day of December, 2010

David J. Kappos
*Director of the United States Patent and Trademark Office*